US011955091B2

(12) United States Patent
Lee et al.

(10) Patent No.: US 11,955,091 B2
(45) Date of Patent: Apr. 9, 2024

(54) DISPLAY DEVICE AND METHOD OF DRIVING DISPLAY DEVICE

(71) Applicant: Samsung Display Co., Ltd., Yongin-si (KR)

(72) Inventors: Sukhun Lee, Suwon-si (KR); Kihyun Pyo, Seoul (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 17/744,112

(22) Filed: May 13, 2022

(65) Prior Publication Data

US 2023/0031528 A1 Feb. 2, 2023

(30) Foreign Application Priority Data

Jul. 29, 2021 (KR) ........................ 10-2021-0099614

(51) Int. Cl.
*G09G 3/3291* (2016.01)

(52) U.S. Cl.
CPC ..... *G09G 3/3291* (2013.01); *G09G 2310/027* (2013.01); *G09G 2320/0257* (2013.01); *G09G 2330/021* (2013.01)

(58) Field of Classification Search
CPC ... G09G 2320/0257; G09G 2320/0247; G09G 2320/029; G09G 2320/0233; G09G 2320/103; G09G 2320/0295; G09G 2320/043; G09G 2320/056; G09G 2320/0693; G09G 2320/046; G09G 2310/027; G09G 3/3275; G09G 3/20; G09G 3/3225; G09G 2340/0435; G09G 2300/0819; G09G 2300/0861
See application file for complete search history.

(56) References Cited

U.S. PATENT DOCUMENTS

| | | | | |
|---|---|---|---|---|
| 2008/0158122 | A1* | 7/2008 | Chen | G09G 3/3648 345/89 |
| 2019/0333472 | A1* | 10/2019 | Kim | G09G 5/02 |
| 2021/0012704 | A1* | 1/2021 | Pyun | G09G 3/32 |
| 2022/0375404 | A1* | 11/2022 | Li | G09G 3/3233 |

FOREIGN PATENT DOCUMENTS

| | | | |
|---|---|---|---|
| KR | 1020070043542 | A | 4/2007 |
| KR | 101142058 | B1 | 5/2012 |
| KR | 101746616 | B1 | 6/2017 |
| KR | 1020190071285 | A | 6/2019 |

* cited by examiner

*Primary Examiner* — Dong Hui Liang
(74) *Attorney, Agent, or Firm* — CANTOR COLBURN LLP

(57) ABSTRACT

A method of driving a display device, which includes a plurality of segments, each including a plurality of pixels, includes comparing grayscales of first image data of a first frame with respect to a segment among the plurality of segments and grayscales of a second image data of a second frame after the first frame with respect to the segment, modulating the second image data to generate first modulated data when the grayscales of the first image data are equal to the grayscales of the second image data, and providing data voltages to the segment based on the first modulated data.

14 Claims, 13 Drawing Sheets

FIG. 6

SEG

| | | | |
|---|---|---|---|
| $PX_{11}$ | $PX_{12}$ | $PX_{13}$ | $PX_{14}$ |
| $PX_{21}$ | $PX_{22}$ | $PX_{23}$ | $PX_{24}$ |
| $PX_{31}$ | $PX_{32}$ | $PX_{33}$ | $PX_{34}$ |
| $PX_{41}$ | $PX_{42}$ | $PX_{43}$ | $PX_{44}$ |

FIG. 7

ID

| | | | |
|---|---|---|---|
| 255 | 255 | 255 | 255 |
| 255 | 255 | 255 | 255 |
| 255 | 255 | 255 | 255 |
| 255 | 255 | 255 | 255 |

FIG. 10

TV

| | | | |
|---|---|---|---|
| 255 | 252 | 255 | 252 |
| 252 | 255 | 252 | 255 |
| 255 | 252 | 255 | 252 |
| 252 | 255 | 252 | 255 |

MOBILE

| | | | |
|---|---|---|---|
| 255 | 254 | 255 | 254 |
| 254 | 255 | 254 | 255 |
| 255 | 254 | 255 | 254 |
| 254 | 255 | 254 | 255 |

FIG. 11

HIGH GRAYSCALE

| | | | |
|---|---|---|---|
| 255 | 252 | 255 | 252 |
| 252 | 255 | 252 | 255 |
| 255 | 252 | 255 | 252 |
| 252 | 255 | 252 | 255 |

LOW GRAYSCALE

| | | | |
|---|---|---|---|
| 100 | 99 | 100 | 99 |
| 99 | 100 | 99 | 100 |
| 100 | 99 | 100 | 99 |
| 99 | 100 | 99 | 100 |

DISPLAY DEVICE AND METHOD OF DRIVING DISPLAY DEVICE

This application claims priority to Korean Patent Application No. 10-2021-0099614, filed on Jul. 29, 2021, and all the benefits accruing therefrom under 35 U.S.C. § 119, the content of which in its entirety is herein incorporated by reference.

BACKGROUND

1. Field

Embodiments relate to a display device. More particularly, embodiments relate to a display device applied to various electronic apparatuses and a method of driving the display device.

2. Description of the Related Art

When a display device displays an image, a partial region of the display device may emit light with a same luminance. When the partial region emits light with the same luminance for a long time, afterimage may occur in the partial region. Further, power consumption of the display device may increase when the partial region emit light with high luminance for a long time.

SUMMARY

Embodiments provide a method of driving a display device for reducing afterimage and power consumption.

Embodiments provide a display device which reduces afterimage and power consumption.

An embodiment of a method of driving a display device, which includes a plurality of segments, each including a plurality of pixels, includes: comparing grayscales of first image data of a first frame with respect to a segment among the plurality of segments and grayscales of a second image data of a second frame after the first frame with respect to the segment; modulating the second image data to generate first modulated data when the grayscales of the first image data are equal to the grayscales of the second image data; and providing data voltages to the segment based on the first modulated data.

In an embodiment, the method may further include: comparing the grayscales of the second image data and grayscales of a third image data of a third frame after the second frame with respect to the segment; modulating the third image data to generate second modulated data when the grayscales of the second image data are equal to the grayscales of the third image data; and providing the data voltages to the segment based on the second modulated data.

In an embodiment, the modulating the second image data may include modulating the grayscales of the second image data with respect to pixels in the segment which are positioned in even rows and odd columns or positioned in odd rows and even columns, and the modulating the third image data may include modulating the grayscales of the third image data with respect to pixels in the segment which are positioned in the odd rows and the odd columns or positioned in the even rows and even columns.

In an embodiment, the modulating the second image data may include modulating the grayscales of the second image data with respect to pixels in the segment which is positioned in an $N^{th}$ row and an $N^{th}$ column, where N is a natural number, and the modulating the third image data may include modulating the grayscales of the third image data with respect to a pixel in the segment which is positioned in the $N^{th}$ row and an $(N+1)^{th}$ column.

In an embodiment, the comparing the grayscales of the first image data and the grayscales of the second image data may include: determining whether the grayscales of the second image data are equal to each other by comparing the grayscales of the second image data with each other; and comparing a representative grayscale of the first image data and a representative grayscale of the second image data.

In an embodiment, the modulating the second image data may include decreasing some grayscales among the grayscales of the second image data.

In an embodiment, decreased amounts of the some grayscales may be determined based on a size of the display device.

In an embodiment, decreased amounts of the some grayscales may be determined based on the representative grayscale of the second image data.

In an embodiment, the comparing the grayscales of the first image data and the grayscales of the second image data may further include storing the representative grayscale of the second image data.

An embodiment of a method of driving a display device, which includes a plurality of pixels, includes: comparing grayscales of first image data of a first frame with respect to the plurality of pixels and grayscales of second image data of a second frame after the first frame with respect to the plurality of pixels; searching a most frequent grayscale among the grayscales of the second image data when the grayscales of the first image data are equal to the grayscales of the second image data; modulating first partial image data, which have the most frequent grayscale, among the second image data to generate first modulated data; and providing data voltages to the plurality of pixels based on the first modulated data.

In an embodiment, the method may further include: comparing the grayscales of the second image data and grayscales of third image data of a third frame after the second frame with respect to the plurality of pixels; modulating second partial image data, which have the most frequent grayscale, among the third image data to generate second modulated data when the grayscales of the second image data are equal to the grayscales of the third image data; and providing the data voltages to the plurality of pixels based on the second modulated data.

In an embodiment, the modulating the first partial image data may include modulating even-numbered grayscales of the first partial image data, and the modulating the second partial image data may include modulating odd-numbered grayscales of the second partial image data.

In an embodiment, the modulating the first partial image data may include decreasing some grayscales among the grayscales of the first partial image data.

In an embodiment, decreased amounts of the some grayscales may be determined based on a size of the display device.

In an embodiment, decreased amounts of the some grayscales may be determined based on the most frequent grayscale.

An embodiment of a display device includes: a display panel including a plurality of segments each including a plurality of pixels; a controller which compares grayscales of first image data of a first frame with respect to a segment among the plurality of segments and grayscales of second image data of a second frame after the first frame with respect to the segment, and to modulate the second image data to generate first modulated data when the grayscales of the first image data are equal to the grayscales of the second image data; and a data driver which provides data voltages to the segment based on the first modulated data.

In an embodiment, the controller may include: a first grayscale comparator which determines whether the grayscales of the second image data are equal to each other by comparing the grayscales of the second image data with each other; a second grayscale comparator which compares a representative grayscale of the first image data and a representative grayscale of the second image data; and a data modulator which modulates the second image data to generate the first modulated data.

In an embodiment, the data modulator may decrease some grayscales among the grayscales of the second image data to generate the first modulated data.

In an embodiment, by comparing the grayscales of the second image data with each other amounts of the some grayscales may be determined based on at least one selected from a size of the display panel and the representative grayscale of the second image data.

In an embodiment, the controller may further include a memory which stores the representative grayscale of the second image data.

In embodiments of the display device and the method of driving the display device according to the invention, when the grayscales of the image data of a current frame are equal to the grayscales of the image data of a previous frame, the image data of the current frame may be modulated in a way such that afterimage of the display device may be reduced. In such embodiments, some grayscales of the grayscales of the modulated image data may be decreased, such that power consumption of the display device may be reduced.

BRIEF DESCRIPTION OF THE DRAWINGS

Illustrative, non-limiting embodiments will be more clearly understood from the following detailed description taken in conjunction with the accompanying drawings.

FIG. 6 is a diagram illustrating a segment according to an embodiment.

FIG. 7 is a diagram illustrating image data according to an embodiment.

FIG. 10 is a diagram illustrating modulated data according to an embodiment.

FIG. 11 is a diagram illustrating modulated data according to an embodiment.

DETAILED DESCRIPTION

Figure 1:
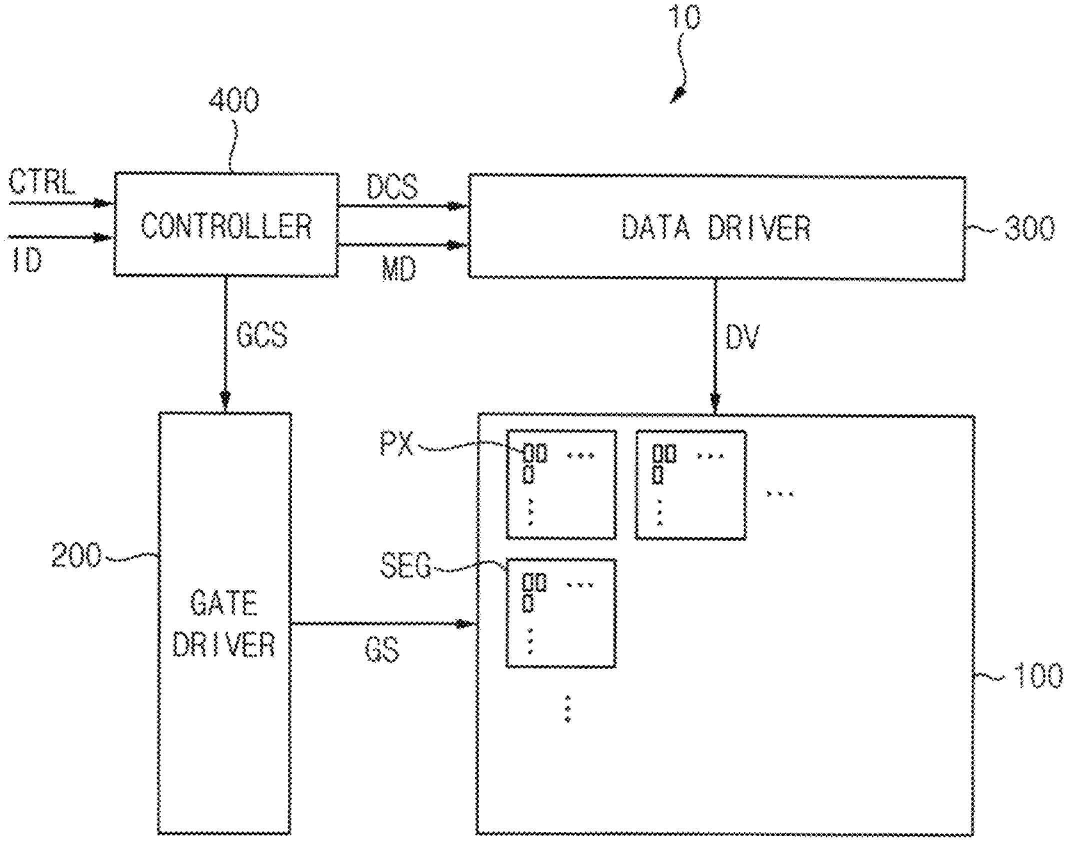
FIG. 1 is a block diagram illustrating a display device according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of a display device and a method of driving display device in accordance with the invention will be described in detail with reference to the accompanying drawings.

FIG. 1 is a block diagram illustrating a display device 10 according to an embodiment.

Referring to FIG. 1, an embodiment of a display device 10 may include a display panel 100, a gate driver 200, a data driver 300, and a controller 400.

The display panel 100 may include a plurality of pixels PX. The display panel 100 may receive gate signals GS from the gate driver 200 and data voltages DV from the data driver 300. Each of the pixels PX may emit light based on the gate signal GS and the data voltage DV.

In an embodiment, each of the pixels PX may include an organic light emitting diode ("OLED"), and the display panel 100 may be an organic light emitting display panel. In an alternative embodiment, each of the pixels PX may include an inorganic light emitting diode, a quantum dot light emitting diode, or the like.

The display panel 100 may be divided into a plurality of segments SEG. Each of the segments SEG may include a plurality of pixels PX. In an embodiment, the number of pixels PX included in each of the segments SEG may be equal to each other. In an alternative embodiment, the number of pixels PX included in each of the segments SEG may be different from each other.

The gate driver 200 may receive a gate control signal GCS from the controller 400. The gate driver 200 may generate the gate signals GS based on the gate control signal GCS. The gate driver 200 may provide the gate signals GS to the display panel 100.

The data driver 300 may receive a data control signal DCS and modulated data MD from the controller 400. The data driver 300 may generate the data voltages DV based on the data control signal DCS and the modulated data MD. The data driver 300 may provide the data voltages DV to the display panel 100.

The controller 400 (e.g., a timing controller ("T-CON")) may receive image data ID and a control signal CTRL from an external host processor (e.g., a graphic processing unit ("GPU") or a graphic card). The controller 400 may generate the gate control signal GCS, the data control signal DCS, and the modulated data MD based on the image data ID and the control signal CTRL. The controller 400 may provide the gate control signal GCS to the gate driver 200, and may provide the data control signal DCS and the modulated data MD to the data driver 300.

The controller 400 may compare grayscales of current image data ID of a current frame and grayscales of previous image data of a previous frame with respect to a same segment SEG. In an embodiment, the current frame may be immediately after the previous frame. In such an embodiment, any frame may not exist between the previous frame and the current frame. In an alternative embodiment, the current frame may be after a frame which is immediately after the previous frame. In such another embodiment, at least one frame may exist between the previous frame and the current frame.

If the grayscales of the current image data ID and the grayscales of the previous image data with respect to the same segment SEG are equal to each other, the controller 400 may modulate the current image data ID to generate the modulated data MD. The current image data ID may be modulated when the grayscales of the current image data ID and the grayscales of the previous image data with respect to the same segment SEG are equal to each other, such that afterimage of the segment SEG may be reduced.

Figure 2:
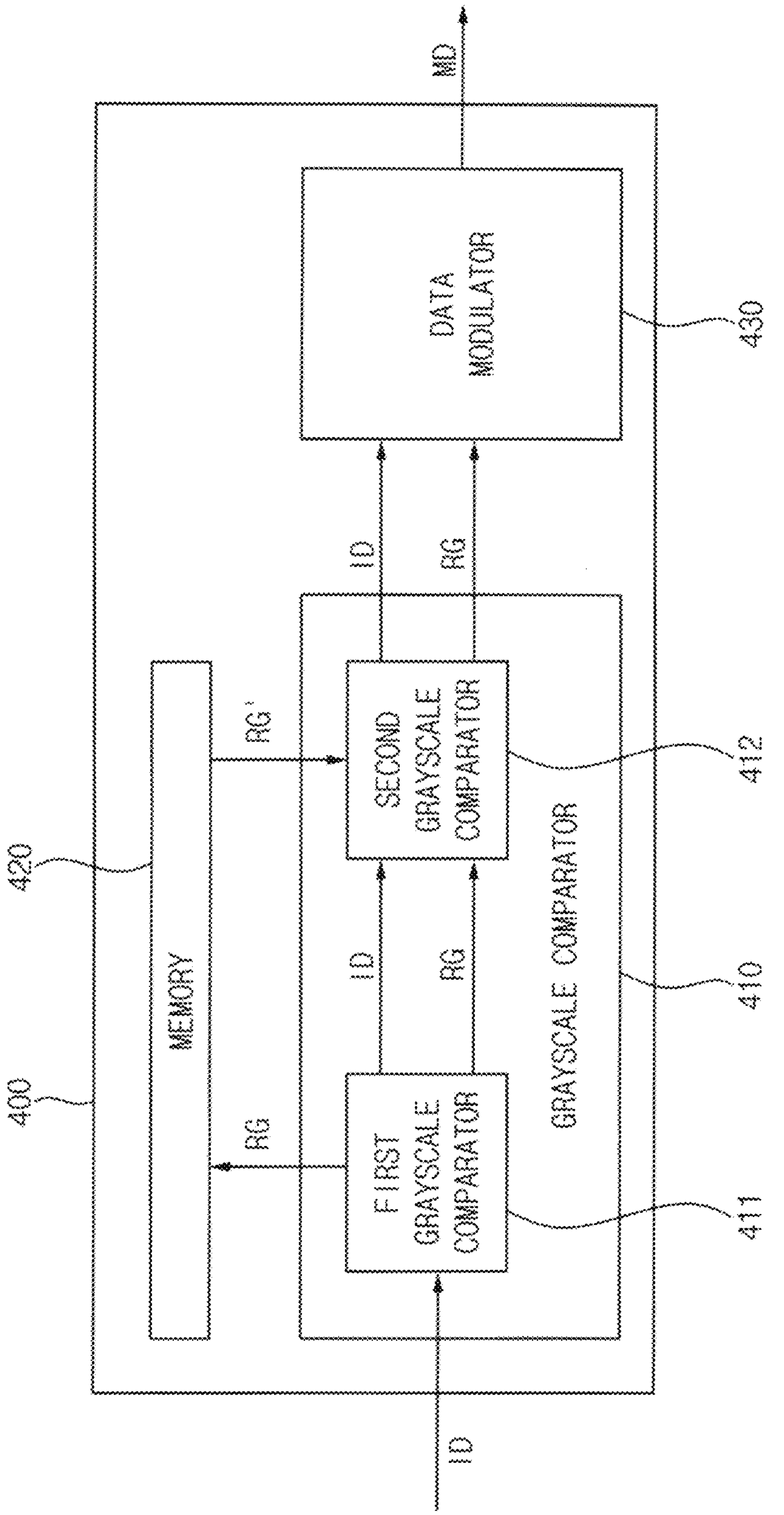
FIG. 2 is a block diagram illustrating an embodiment of a controller included in the display device in FIG. 1.

FIG. 2 is a block diagram illustrating an embodiment of the controller 400 included in the display device 10 in FIG. 1.

Referring to FIGS. 1 and 2, an embodiment of the controller 400 may include a grayscale comparator 410, a memory 420, and a data modulator 430.

The grayscale comparator 410 may compare the grayscales of the previous image data and the grayscales of the current image data ID with respect to a segment SEG. In an embodiment, the grayscale comparator 410 may include a first grayscale comparator 411 and a second grayscale comparator 412.

The first grayscale comparator 411 may determine whether the grayscales of the current image data ID with respect to the segment SEG are equal to each other by comparing the grayscales of the current image data ID with each other. If the grayscales of the current image data ID with respect to the segment SEG are different from each other, the controller 400 may not modulate the current image data ID with respect to the segment SEG. If the grayscales of the current image data ID with respect to the segment SEG are equal to each other, the first grayscale comparator 411 may generate a representative grayscale RG of the current image data ID with respect to the segment SEG. The representative grayscale RG of the current image data ID with respect to the segment SEG may be one of the same grayscales of the current image data ID with respect to the segment SEG.

If the grayscales of the current image data ID with respect to the segment SEG are equal to each other, the second grayscale comparator 412 may compare a representative grayscale RG' of the previous image data with respect to the segment SEG and the representative grayscale RG of the current image data ID with respect to the segment SEG. The representative grayscale RG' of the previous image data with respect to the segment SEG may be one of the same grayscales of the previous image data with respect to the segment SEG. If the representative grayscale RG' of the previous image data with respect to the segment SEG is different from the representative grayscale RG of the current image data ID with respect to the segment SEG, the controller 400 may not modulate the current image data ID with respect to the segment SEG.

The memory 420 may store the representative grayscale RG of the current image data ID with respect to the segment SEG. The memory 420 may provide the representative grayscale RG' of the previous image data with respect to the segment SEG to the second grayscale comparator 412.

If the representative grayscale RG of the current image data ID with respect to the segment SEG is equal to the representative grayscale RG' of the previous image data with respect to the segment SEG, the data modulator 430 may modulate the current image data ID with respect to the segment SEG to generate the modulated data MD.

Figure 3:
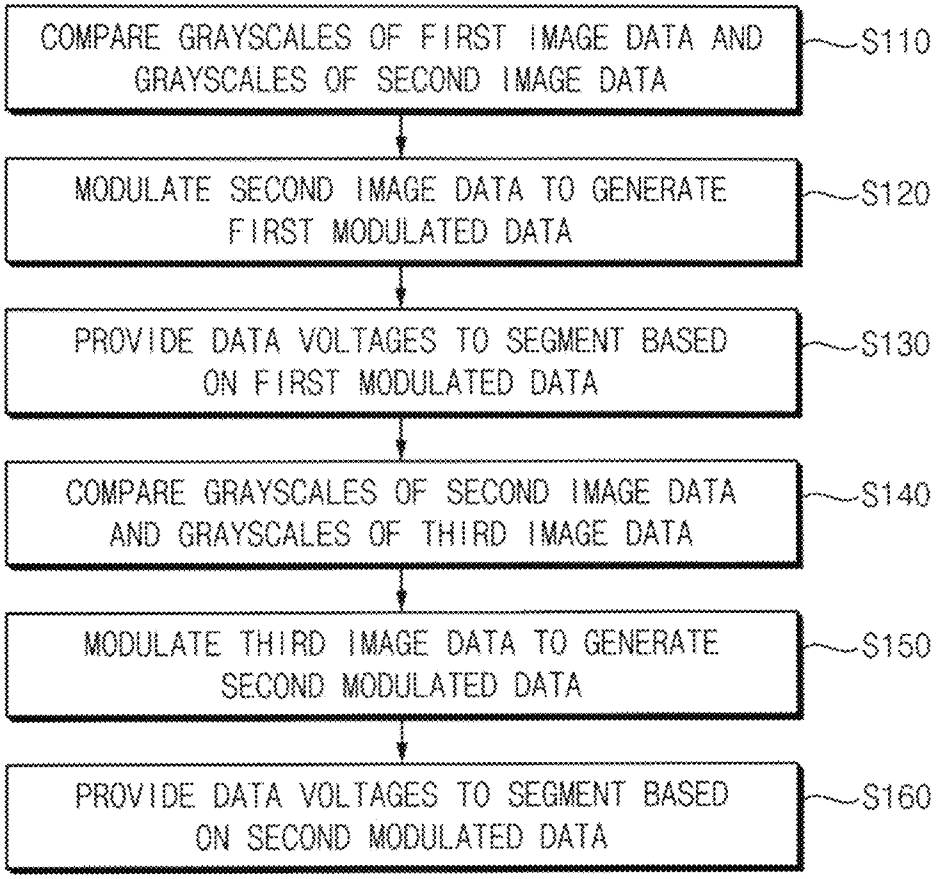
FIGS. 3 and 4 are flowcharts illustrating a method of driving a display device according to an embodiment.
Figure 4:
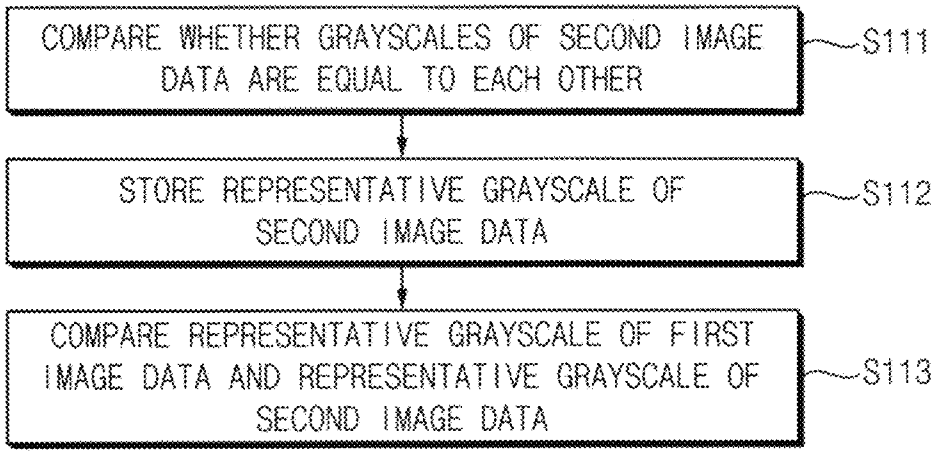

FIGS. 3 and 4 are flowcharts illustrating a method of driving the display device 10 according to an embodiment.

Referring to FIGS. 1, 2, and 3, in an embodiment of a method of driving the display device 10, the grayscale comparator 410 may compare grayscales of first image data of a first frame and grayscales of a second image data ID of a second frame with respect to a segment SEG (S110). In an embodiment, the first frame may be the previous frame, and the second frame may be the current frame.

Referring to FIGS. 1, 2, 3, and 4, the first grayscale comparator 411 may compare whether the grayscales of the second image data ID with respect to the segment SEG are equal to each other (S111). If the grayscales of the second image data ID with respect to the segment SEG are different from each other, the controller 400 may not modulate the second image data ID with respect to the segment SEG. If the grayscales of the second image data ID with respect to the segment SEG are equal to each other, the first grayscale comparator 411 may generate a representative grayscale RG of the second image data ID with respect to the segment SEG.

The memory 420 may store the representative grayscale RG of the second image data ID with respect to the segment SEG (S112).

The second grayscale comparator 412 may compare a representative grayscale RG' of the first image data with respect to the segment SEG and the representative grayscale RG of the second image data ID with respect to the segment SEG (S113). If the representative grayscale RG' of the first image data with respect to the segment SEG is different from the representative grayscale RG of the second image data ID with respect to the segment SEG, the controller 400 may not modulate the second image data ID with respect to the segment SEG.

Figure 5:
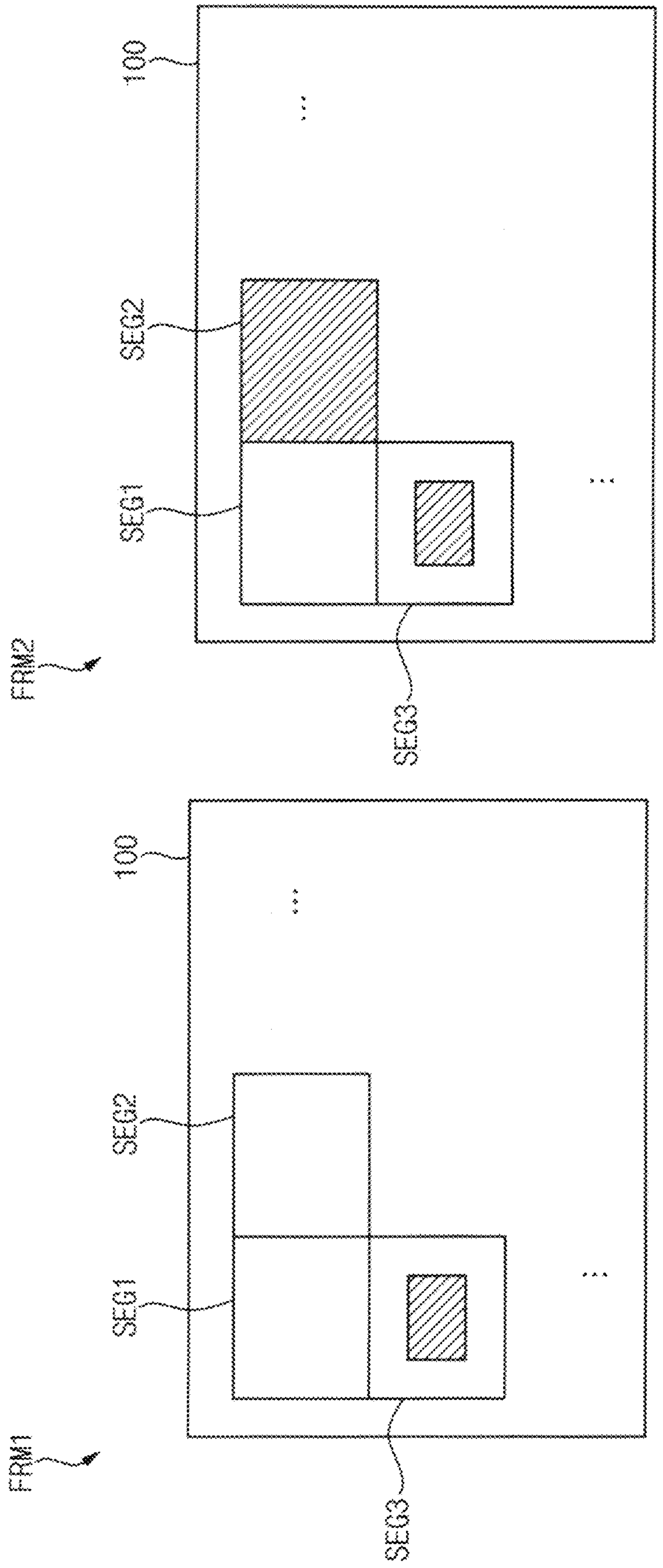
FIG. 5 is a diagram illustrating a display panel in different frames according to an embodiment.

FIG. 5 is a diagram illustrating the display panels 100 of different frames FRM1 and FRM2 according to an embodiment.

Referring to FIGS. 2 and 5, the display panel 100 may include a first segment SEG1, a second segment SEG2, and a third segment SEG3, and each of the first segment SEG1, the second segment SEG2, and the third segment SEG3 may include a plurality of pixels.

In an embodiment, grayscales of image data ID of the second frame FRM2 with respect to the first segment SEG1 may be equal to each other, the grayscales of the image data ID of the second frame FRM2 with respect to the second segment SEG2 may be equal to each other, and the grayscales of the image data ID of the second frame FRM2 with respect to the third segment SEG3 may be different from each other. In such an embodiment, the first grayscale comparator 411 may generate the representative grayscale RG of the image data ID of the second frame FRM2 with respect to each of the first segment SEG1 and the second segment SEG2, and the controller 400 may not modulate the image data ID of the second frame FRM2 with respect to the third segment SEG3.

In such an embodiment, the memory 420 may provide a representative grayscale RG' of image data of the first frame FRM1 with respect to each of the first segment SEG1 and the second segment SEG2 to the second grayscale comparator 412.

In such an embodiment, the representative grayscale RG' of the image data of the first frame FRM1 with respect to the first segment SEG1 may equal to the representative grayscale RG of the image data ID of the second frame FRM2 with respect to the first segment SEG1, and the representative grayscale RG' of the image data of the first frame FRM1 with respect to the second segment SEG2 may be different from the representative grayscale RG of the image data ID of the second frame FRM2 with respect to the second segment SEG2. In such an embodiment, the controller 400 may not modulate the image data ID of the second frame FRM2 with respect to the second segment SEG2.

Referring to FIGS. 1, 2, and 3 again, in an embodiment of a method of driving the display device 10, the data modulator 430 may modulate the second image data ID with respect to the segment SEG to generate a first modulated data MD (S120). In an embodiment, as described above with reference to FIGS. 2 and 5, the data modulator 430 may modulate the image data ID of the second frame FRM2 with respect to the first segment SEG1 to generate the first modulated data MD. The data modulator 430 may decrease some grayscales among the grayscales of the second image data ID with respect to the segment SEG. Decreased amounts of the some grayscales of the second image data ID with respect to the segment SEG may be determined based on a just noticeable difference. In such an embodiment, the some grayscales of the second image data ID with respect to the segment SEG may be decreased to a level that may not be recognized by a user.

In an embodiment of a method of driving the display device 10, the data driver 300 may provide the data voltages DV to the segment SEG based on the first modulated data MD (S130).

In an embodiment of a method of driving the display device 10, the grayscale comparator 410 may compare the grayscales of the second image data with respect to the segment SEG and grayscales of third image data ID of a third frame with respect to the segment SEG (S140). In an embodiment, the third frame may be immediately after the second frame. In such an embodiment, any frame may not exist between the second frame and the third frame. In an alternative embodiment, the third frame may after a frame which is immediately after the second frame. In such another embodiment, at least one frame may exist between the second frame and the third frame.

In an embodiment of a method of driving the display device 10, if the grayscales of the third image data ID with respect to the segment SEG are equal to each other, and the grayscales of the second image data with respect to the segment SEG are equal to the grayscales of the third image data ID with respect to the segment SEG, the data modulator 430 may modulate the third image data ID with respect to the segment SEG to generate second modulated data MD (S150). The data modulator 430 may decrease some grayscales of the grayscales of the third image data ID with respect to the segment SEG. Decreased amounts of the some grayscales of the third image data ID with respect to the segment SEG may be determined based on the just noticeable difference. In such an embodiment, the some grayscales of the third image data ID with respect to the segment SEG may be decreased to a level that may not be recognized by the user. The decreased some grayscales of the third image data ID with respect to the segment SEG may be different from the decreased some grayscales of the second image data with respect to the segment SEG.

In an embodiment of a method of driving the display device 10, the data driver 300 may provide the data voltages DV to the segment SEG based on the second modulated data MD (S160).

In an embodiment, as described above, when the grayscales of the first image data, the grayscales of the second image data ID, and the grayscales of the third image data ID with respect to the segment SEG are equal to each other, the second image data ID and the third image data ID with respect to the segment SEG may be modulated, such that afterimage of the segment SEG may be reduced. In such an embodiment, some grayscales of the grayscales of each of the modulated second image data ID and the modulated third image data ID may be decreased, such that power consumption of the display device 10 may be reduced.

Although not illustrated in FIG. 3, an embodiment of the method of driving the display device 10 described above may be performed substantially in a same manner for a fourth frame after the third frame, a fifth frame after the fourth frame, or the like.

Figure 8:
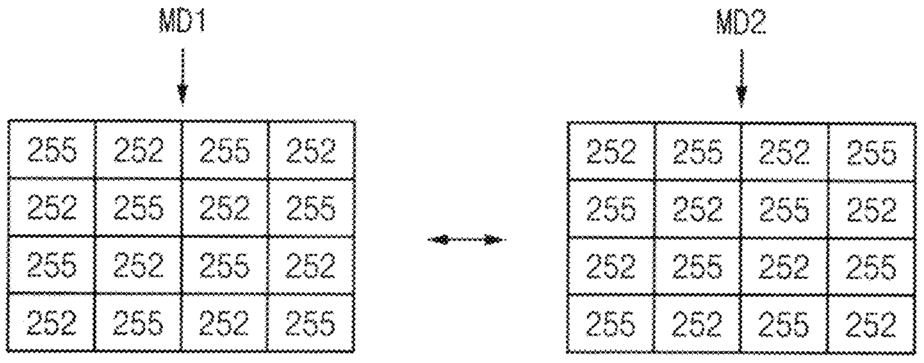
FIG. 8 is a diagram illustrating modulated data according to an embodiment.

FIG. 6 is a diagram illustrating a segment SEG according to an embodiment. FIG. 7 is a diagram illustrating image data ID according to an embodiment. FIG. 8 is a diagram illustrating modulated data MD1 and MD2 according to an embodiment.

Referring to FIGS. 2, 3, 6, 7, and 8, in an embodiment, the segment SEG may include pixels $PX_{11}$ to $PX_{44}$ arranged in 4 rows and 4 columns. However, the invention is not limited thereto, and in an alternative embodiment, the segment SEG may include various arrays and/or numbers of pixels. The grayscales of the image data ID of the second frame with respect to the segment SEG may be equal to each other, the grayscales of the image data ID of the third frame with respect to the segment SEG may be equal to each other, and the grayscales of the image data ID of the second frame with respect to the segment SEG may be equal to the grayscales of the image data ID of the third frame with respect to the segment SEG. In an embodiment, for example, each of the grayscales of the image data ID of the second frame and the third frame with respect to the segment SEG may be 255.

In a process of modulating the second image data ID to generate the first modulated data MD1 (S120), the data modulator 430 may modulate the grayscales of the second image data ID with respect to pixels $PX_{12}$, $PX_{14}$, $PX_{21}$, $PX_{23}$, $PX_{32}$, $PX_{34}$, $PX_{41}$, and $PX_{43}$ positioned in even rows and odd columns or positioned in odd rows and even columns of the segment SEG to generate the first modulated data MD1. In an embodiment, for example, the data modulator 430 may decrease the grayscales of the second image data ID with respect to the pixels $PX_{12}$, $PX_{14}$, $PX_{21}$, $PX_{23}$, $PX_{32}$, $PX_{34}$, $PX_{41}$, and $PX_{43}$ positioned in the even rows and the odd columns or positioned in the odd rows and the even columns of the segment SEG from 255 to 252.

In a process of modulating the third image data ID to generate the second modulated data MD2 (S150), the data modulator 430 may modulate the grayscales of the third image data ID with respect to pixels $PX_{11}$, $PX_{13}$, $PX_{22}$, $PX_{24}$, $PX_{31}$, $PX_{33}$, $PX_{42}$, and $PX_{44}$ positioned in the odd rows and the odd columns or positioned in the even rows and the even columns of the segment SEG to generate the second modulated data MD2. In an embodiment, for example, the data modulator 430 may decrease the grayscales of the third image data ID with respect to the pixels $PX_{11}$, $PX_{13}$, $PX_{22}$, $PX_{24}$, $PX_{31}$, $PX_{33}$, $PX_{42}$, and $PX_{44}$ positioned in the odd rows and the odd columns or positioned in the even rows and the even columns of the segment SEG from 255 to 252.

Figure 9:
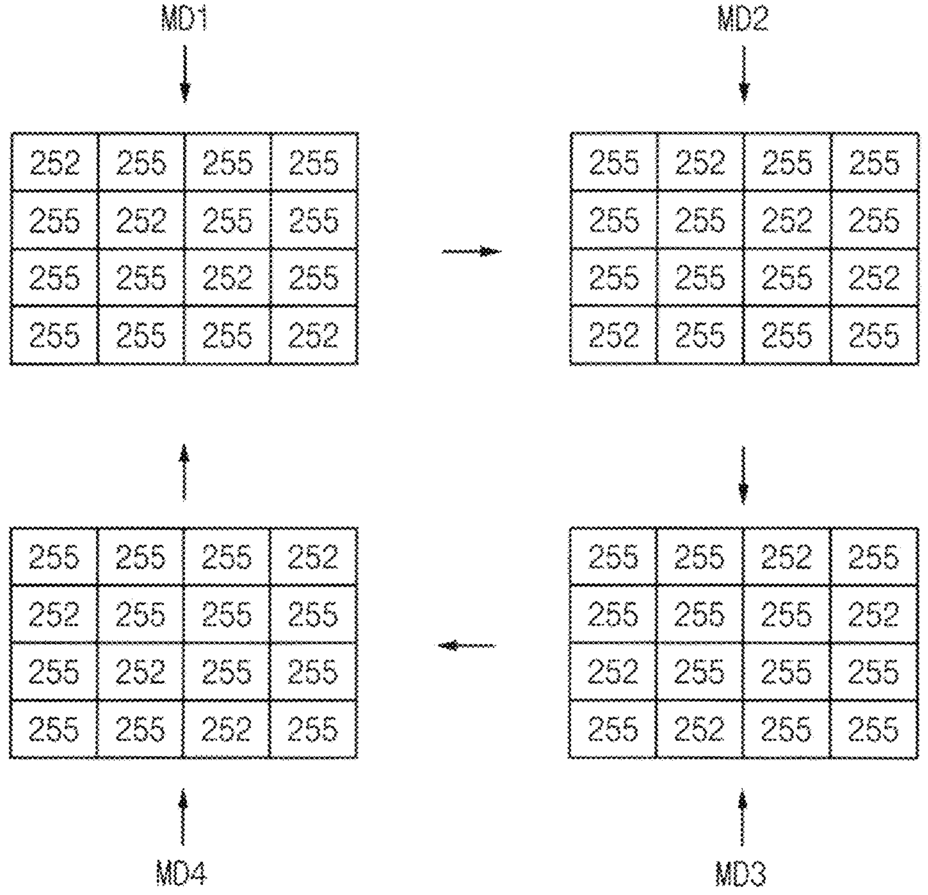
FIG. 9 is a diagram illustrating modulated data according to an embodiment.

FIG. 9 is a diagram illustrating modulated data MD1, MD2, MD3, and MD4 according to an embodiment.

Referring to FIGS. 2, 3, 6, 7, and 9, in an embodiment, in a process of modulating the second image data ID to generate the first modulated data MD1 (S120), the data modulator 430 may modulate the grayscales of the second image data ID with respect to pixels $PX_{11}$, $PX_{22}$, $PX_{33}$, and $PX_{44}$, each positioned in an $N^{th}$ row (N is a natural number) and an $N^{th}$ column of the segment SEG to generate the first modulated data MD1. In an embodiment, for example, the data modulator 430 may decrease the grayscales of the second image data ID with respect to the pixels $PX_{11}$, $PX_{22}$, $PX_{33}$, and $PX_{44}$, each positioned in the $N^{th}$ row and the $N^{th}$ column of the segment SEG from 255 to 252.

In a process of modulating the third image data ID to generate the second modulated data MD2 (S150), the data modulator 430 may modulate the grayscales of the third image data ID with respect to pixels $PX_{12}$, $PX_{23}$, $PX_{34}$, and $PX_{41}$, each positioned in the $N^{th}$ row and an $(N+1)^{th}$ column of the segment SEG to generate the second modulated data MD2. In an embodiment, for example, the data modulator 430 may decrease the grayscales of the third image data ID with respect to the pixels $PX_{12}$, $PX_{23}$, $PX_{34}$, and $PX_{41}$, each positioned in the $N^{th}$ row and the $(N+1)^{th}$ column of the segment SEG from 255 to 252.

The data modulator 430 may modulate grayscales of the fourth image data with respect to pixels $PX_{13}$, $PX_{24}$, $PX_{31}$, and $PX_{42}$, each positioned in the $N^{th}$ row and $(N+2)^{th}$ column of the segment SEG to generate third modulated data MD3. In an embodiment, for example, the data modulator 430 may decrease the grayscales of the fourth image data with respect to the pixels $PX_{13}$, $PX_{24}$, $PX_{31}$, and $PX_{42}$, each positioned in the $N^{th}$ row and the $(N+2)^{th}$ column of the segment SEG from 255 to 252.

The data modulator 430 may modulate grayscales of the fifth image data with respect to pixels $PX_{14}$, $PX_{21}$, $PX_{32}$, and $PX_{43}$, each positioned in the $N^{th}$ row and $(N+3)^{th}$ column of the segment SEG to generate fourth modulated data MD4. In an embodiment, for example, the data modulator 430 may decrease the grayscales of the fifth image data with respect to the pixels $PX_{14}$, $PX_{21}$, $PX_{32}$, and $PX_{43}$, each positioned in the $N^{th}$ row and the $(N+3)^{th}$ column of the segment SEG from 255 to 252.

FIG. 10 is a diagram illustrating modulated data according to an embodiment.

Referring to FIGS. 1, 2, 3, 6, 7, and 10, in an embodiment, in a process of modulating the second image data ID to generate the first modulated data MD1 (S120) and modulating the third image data ID to generate the second modulated data MD2 (S150), decreased amounts of the some grayscales of the image data ID with respect to the segment SEG, which are modulated by the data modulator 430, may be determined based on a size of the display device 10 (or the display panel 100). In an embodiment, as shown in FIG. 10, the deceased amounts of the some grayscales of the image data ID with respect to the segment SEG may be relatively large when the size of the display device 10 is relatively large, such as a television ("TV"), and the decrement amounts of the some grayscales of the image data ID with respect to the segment SEG may be relatively small when the size of the display device 10 is relatively small, such as a mobile device. In an embodiment where the size of the display device 10 is relatively large, the user may not recognize the decrement although the decrement amounts of the some grayscales of the image data ID with respect to the segment SEG is large, therefore, power consumption of the display device 10 may be reduced by more decreasing the some grayscales of the image data ID with respect to the segment SEG. In an embodiment where the size of the display device 10 is relatively small, the user may recognize the decrement if the decreased amounts of the some grayscales of the image data ID with respect to the segment SEG is large, therefore, the some grayscales of the image data ID with respect to the segment SEG may be decreased small.

FIG. 11 is a diagram illustrating modulated data according to an embodiment.

Referring to FIGS. 1, 2, 3, 6, 7, and 11, in an embodiment, in a process of modulating the second image data ID to generate the first modulated data MD1 (S120) and a process of modulating the third image data ID to generate the second modulated data MD2 (S150), decreased amounts of the some grayscales of the image data ID with respect to the segment SEG, which are modulated by the data modulator 430, may be determined based on the representative grayscale RG of the image data ID with respect to the segment SEG. The decreased amounts of the some grayscales of the image data ID with respect to the segment SEG may be relatively large when the representative grayscale RG of the image data ID with respect to the segment SEG is a high grayscale, and the decreased amounts of the some grayscales of the image data ID with respect to the segment SEG may be relatively small when the representative grayscale RG of the image data ID with respect to the segment SEG is a low grayscale. When the representative grayscale RG of the image data ID with respect to the segment SEG is the high grayscale, the user may not recognize the decrement although the decrement amounts of the some grayscales of the image data ID with respect to the segment SEG is large, therefore, power consumption of the display device 10 may be reduced by more decreasing the some grayscales of the image data ID with respect to the segment SEG. When the representative grayscale RG of the image data ID with respect to the segment SEG is the low grayscale, the user may recognize the decrement if the decrement amounts of the some grayscales of the image data ID with respect to the segment SEG is large, therefore, the some grayscales of the image data ID with respect to the segment SEG may be decreased small.

Figure 12:
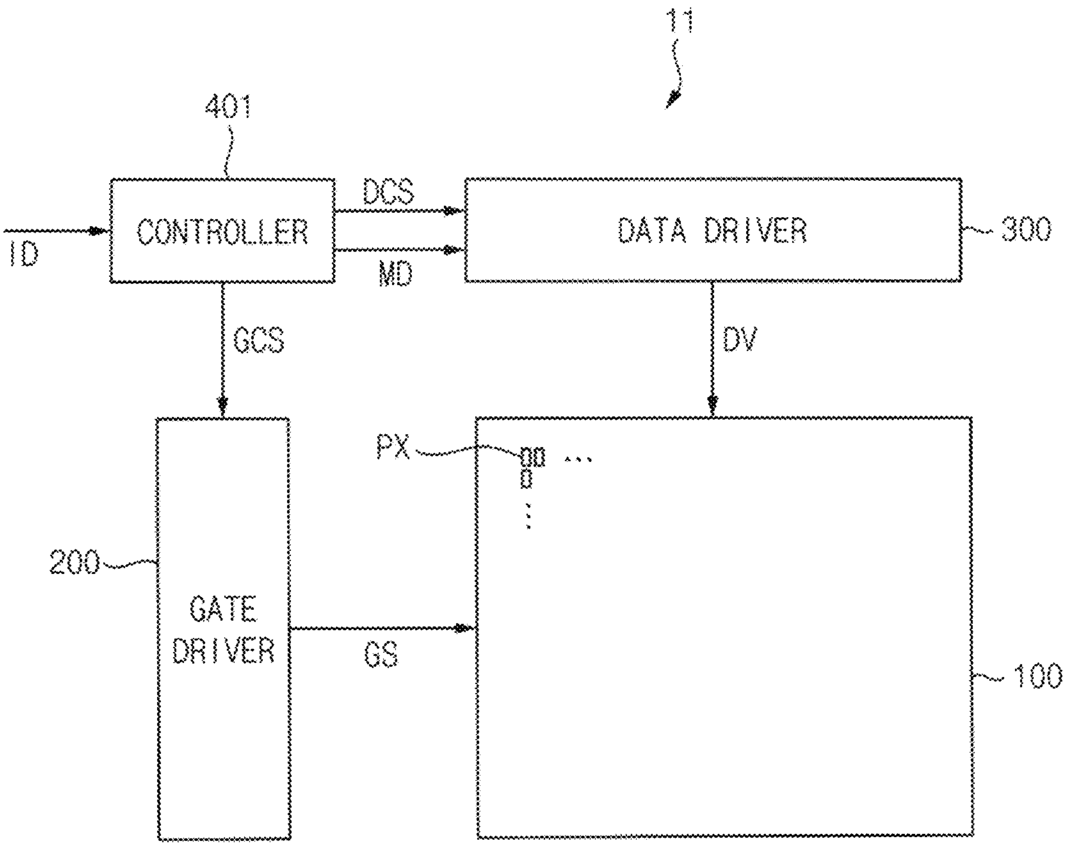
FIG. 12 is a block diagram illustrating a display device according to an alternative embodiment.

FIG. 12 is a block diagram illustrating a display device 11 according to an alternative embodiment.

Referring to FIG. 12, an embodiment of a display device 11 may include a display panel 100, a gate driver 200, a data driver 300, and a controller 401. For convenience of description, any repetitive detailed descriptions of the same or like components of the display device 11 of FIG. 12 as those of the display device 10 described above with reference to FIG. 1 will hereinafter be omitted.

The controller 401 may compare grayscales of current image data ID of a current frame with respect to pixels PX and grayscales of previous image data of a previous frame with respect to the pixels PX. If the grayscales of the current image data ID with respect to the pixels PX are equal to the grayscales of the previous image data with respect to the pixels PX, the controller 401 may search a most frequent grayscale among the grayscales of the current image data ID. The controller 401 may modulate partial image data, which have the most frequent grayscale among the grayscales of the current image data ID, to generate modulated data MD.

Figure 13:
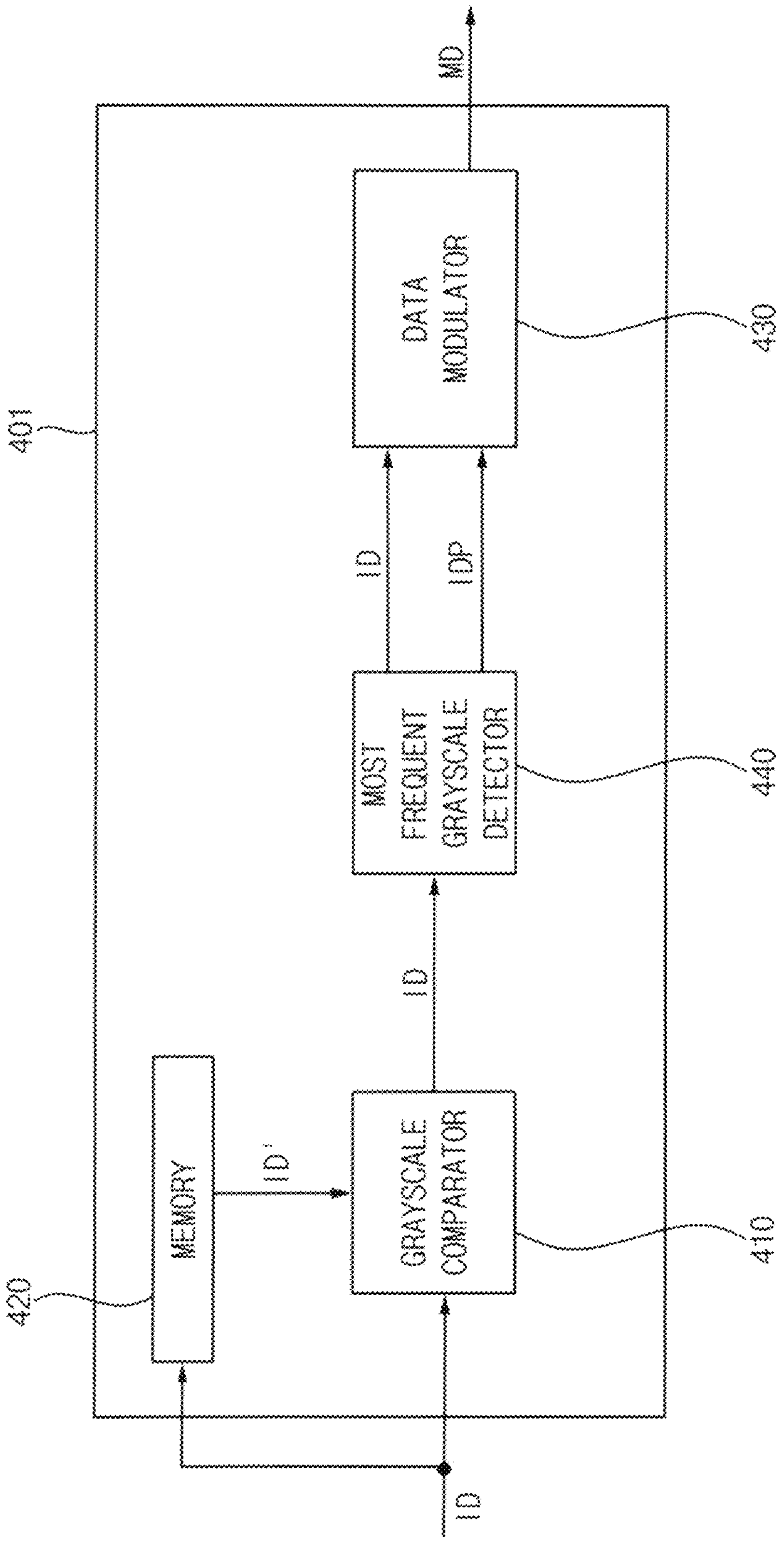
FIG. 13 is a block diagram illustrating an embodiment of a controller included in the display device in FIG. 12.

FIG. 13 is a block diagram illustrating an embodiment of the controller 401 included in the display device 11 in FIG. 12.

Referring to FIGS. 12 and 13, an embodiment of the controller 401 may include a grayscale comparator 410, a memory 420, a most frequent grayscale detector 440, and a data modulator 430. For convenience of description, any repetitive detailed descriptions of the same or like components of the controller 401 of FIG. 13 as those of the controller 400 described above with reference to FIG. 2, will hereinafter be omitted.

The memory 420 may store the current image data ID with respect to the pixels PX. The memory 420 may provide the previous image data ID' with respect to the pixels PX to the grayscale comparator 410.

The grayscale comparator 410 may compare the grayscales of the previous image data ID' with respect to the pixels PX and the grayscales of the current image data ID with respect to the pixels PX. If the grayscales of the previous image data ID' with respect to the pixels PX are different from the grayscales of the current image data ID with respect to the pixels PX, the controller 401 may not modulate the current image data ID with respect to the pixels PX.

If the grayscales of the previous image data ID' with respect to the pixels PX are equal to the grayscales of the current image data ID with respect to the pixels PX, the most frequent grayscale detector 440 may search the most frequent grayscale among the grayscales of the current image data ID with respect to the pixels PX. The most frequent grayscale detector 440 may generate the partial image data IDP, which have the most frequent grayscale of the current image data ID with respect to the pixels PX, based on the current image data ID with respect to the pixels PX and the most frequent grayscale.

The data modulator 430 may modulate the partial image data IDP, and may generate modulated data MD based on the current image data ID with respect to the pixels PX and the modulated partial image data IDP. The current image data ID may be modulated when the grayscales of the current image data ID with respect to the pixels PX are equal to the grayscales of the previous image data ID' with respect to the pixels PX, such that afterimage of the display device 10 may be reduced.

Figure 14:
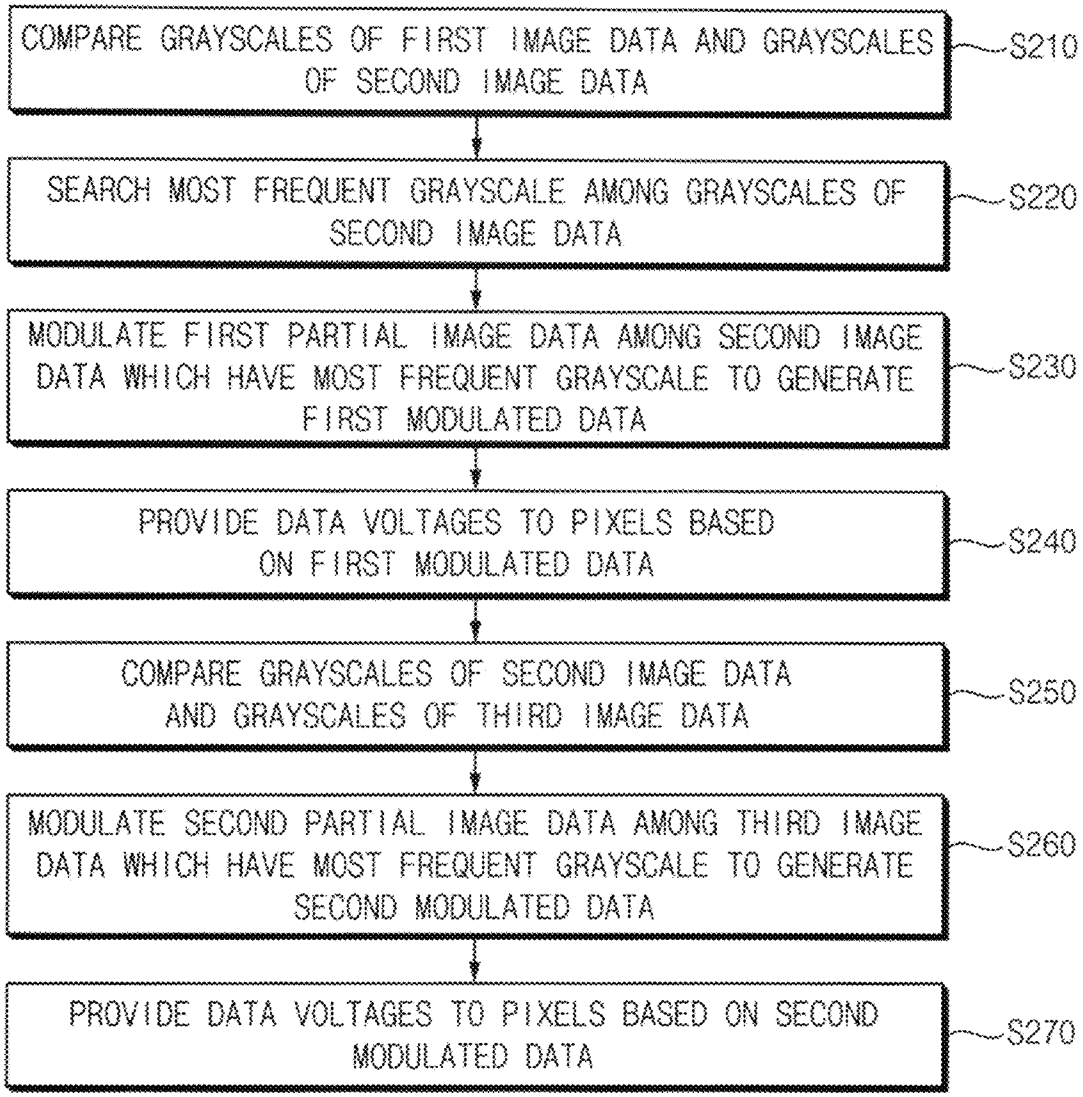
FIG. 14 is a flowchart illustrating a method of driving a display device according to an alternative embodiment.

FIG. 14 is a flowchart illustrating a method of driving the display device 11 according to an alternative embodiment.

Referring to FIGS. 12, 13, and 14, in an embodiment of a method of driving the display device 11, the grayscale comparator 410 may compare grayscales of first image data ID' of a first frame with respect to the pixels PX and grayscales of second image data ID of a second frame with respect to the pixels PX (S210). In an embodiment, the first frame may be the previous frame, and the second frame may be the current frame.

The most frequent grayscale detector 440 may search the most frequent grayscale among the grayscales of the second image data ID with respect to the pixels PX (S220). The most frequent grayscale detector 440 may generate a first partial image data IDP, which have the most frequent grayscale among the second image data ID with respect to the pixels PX, based on the second image data ID with respect to the pixels PX and the most frequent grayscale.

The data modulator 430 may modulate the first partial image data IDP to generate first modulated data MD (S230). The data modulator 430 may decrease some grayscales among the grayscales of the first partial image data IDP. Decreased amounts of the some grayscales of the first partial image data IDP may be determined based on a just noticeable difference. In such an embodiment, the some grayscales of the first partial image data IDP may bed decreased to a level that may not be recognized by a user.

The data driver 300 may provide the data voltages DV to the pixels PX based on the first modulated data MD (S240).

The grayscale comparator 410 may compare the grayscales of the second image data ID' and grayscales of third image data ID of a third frame with respect to the pixels PX (S250). In an embodiment, the third frame may be a frame immediately after the second frame. In such an embodiment, any frame may not exist between the second frame and the third frame. In an alternative embodiment, the third frame may be after a frame immediately after the second frame. In such another embodiment, at least one frame may exist between the second frame and the third frame.

If the grayscales of the second image data ID' with respect to the pixels PX are equal to the grayscales of the third image data ID with respect to the pixels PX, the data modulator 430 may modulate a second partial image data IDP, which have a most frequent grayscale among the third image data ID with respect to the pixels PX, to generate second modulated data MD (S260). The data modulator 430 may decrease some grayscales among the grayscales of the second partial image data IDP. Decreased amounts of the some grayscales of the second partial image data IDP may be determined based on the just noticeable difference. In such an embodiment, the some grayscales of the second partial image data IDP may be decreased to a level that may not be recognized by the user. The decreased some grayscales of the second partial image data IDP may be different from the decreased some grayscales of the first partial image data IDP.

The data driver 300 may provide the data voltages DV to the pixels PX based on the second modulated data MD (S270).

In an embodiment, when the grayscales of the first image data ID', the grayscales of the second image data ID, and the grayscales of the third image data ID with respect to the pixels PX are equal to each other, the second image data ID and the third image data ID with respect to the pixels PX may be modulated, such that afterimage of the display device 11 may be reduced. In such an embodiment, the some grayscales of the grayscales of each of the modulated first partial image data IDP and the modulated second partial image data IDP may be decreased, such that power consumption of the display device 11 may be reduced.

Figure 15:
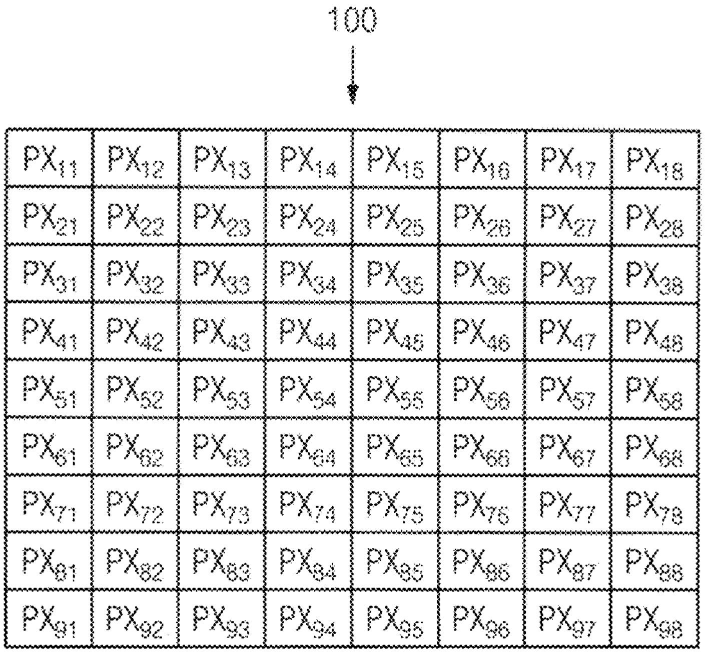
FIG. 15 is a diagram illustrating a display panel according to an embodiment.
Figure 16:
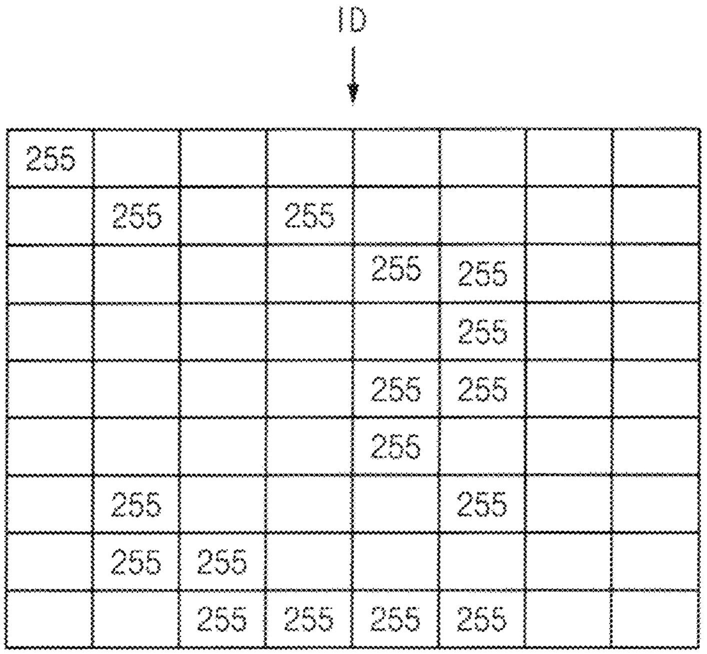
FIG. 16 is a diagram illustrating image data according to an embodiment.
Figure 17:
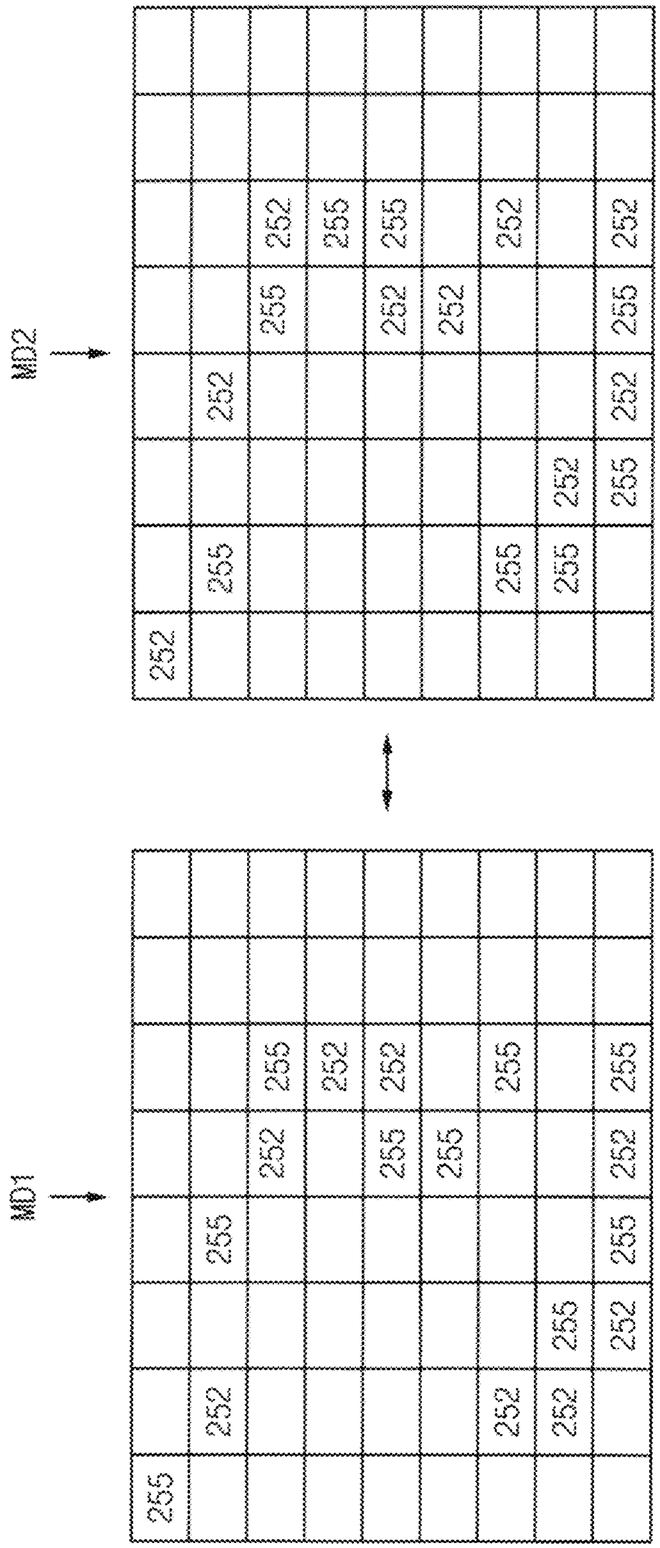
FIG. 17 is a diagram illustrating modulated data according to an embodiment.

FIG. 15 is a diagram illustrating the display panel 100 according to an embodiment. FIG. 16 is a diagram illustrating image data ID according to an embodiment. FIG. 17 is a diagram illustrating modulated data MD1 and MD2 according to an embodiment.

Referring to FIGS. 13, 14, 15, 16, and 17, in an embodiment, the display panel 100 may include pixels $PX_{11}$ to $PX_{98}$ arranged in 9 rows and 8 columns. However, the invention is not limited thereto, and in an alternative embodiment, the display panel 100 may include various arrays and/or numbers of pixels. The grayscales of the image data ID of the second frame may be equal to the grayscales of the image data ID of the third frame. In an embodiment, for example, the most frequent grayscale among the grayscales of the image data ID of the second frame and the third frame may be 255.

In a process of modulating the first partial image data IDP to generate the first modulated data MD1 (S230), the data modulator 430 may modulate even-numbered grayscales of the first partial image data IDP to generate the first modulated data MD1. In an embodiment, for example, the data modulator 430 may decrease the even-numbered grayscales of the first partial image data IDP with respect to some pixels $PX_{22}$, $PX_{35}$, $PX_{46}$, $PX_{56}$, $PX_{72}$, $PX_{82}$, $PX_{93}$, and $PX_{95}$ among the pixels $PX_{11}$, $PX_{22}$, $PX_{24}$, $PX_{35}$, $PX_{36}$, $PX_{46}$, $PX_{55}$, $PX_{56}$, $PX_{65}$, $PX_{72}$, $PX_{76}$, $PX_{82}$, $PX_{83}$, $PX_{93}$, $PX_{94}$, $PX_{95}$, and $PX_{96}$ to which the first partial image data IDP are applied from 255 to 252.

In a process of modulating the second partial image data IDP to generate the second modulated data MD2 (S260), the data modulator 430 may modulate odd-numbered grayscales of the second partial image data IDP to generate the second modulated data MD2. In an embodiment, for example, the data modulator 430 may decrease the odd-numbered grayscales of the second partial image data IDP with respect to some pixels $PX_{11}$, $PX_{24}$, $PX_{36}$, $PX_{55}$, $PX_{65}$, $PX_{76}$, $PX_{83}$, $PX_{94}$, and $PX_{96}$ among the pixels $PX_{11}$, $PX_{22}$, $PX_{24}$, $PX_{35}$, $PX_{36}$, $PX_{46}$, $PX_{55}$, $PX_{56}$, $PX_{65}$, $PX_{72}$, $PX_{76}$, $PX_{82}$, $PX_{83}$, $PX_{93}$, $PX_{94}$, $PX_{95}$, and $PX_{96}$ to which the second partial image data IDP applied from 255 to 252.

In an embodiment, in a process of modulating the first partial image data IDP to generate the first modulated data MD1 (S230) and a process of modulating the second partial image data IDP to generate the second modulated data MD2 (S260), decreased amounts of the some grayscales of the partial image data IDP, which are modulated by the data modulator 430, may be determined based on a size of the display device 10 (or the display panel 100) or the most frequent grayscale. The decreased amounts of the some grayscales of the partial image data IDP may be relatively large in an embodiment where the size of the display device 10 is relatively large, such as a television, and the decrement amounts of the some grayscales of the partial image data IDP may be relatively small in an embodiment where the size of the display device 10 is relatively small, such as a mobile device. In an embodiment, the decreased amounts of the some grayscales of the partial image data IDP may be relatively large when the most frequent grayscale is a high grayscale, and the decreased amounts of the some grayscales of the partial image data IDP may be relatively small when the most frequent grayscale is a low grayscale.

In embodiments of the display device and the method of driving the display device according to the invention may be applied to a display device included in a computer, a notebook, a mobile phone, a smart phone, a smart pad, a portable media player ("PMP"), a personal digital assistant ("PDA"), an MP3 player, or the like.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A method of driving a display device including a plurality of segments, each including a plurality of pixels, the method comprising:

comparing grayscales of first image data of a first frame with respect to a segment among the plurality of segments and grayscales of a second image data of a second frame after the first frame with respect to the segment;

modulating the second image data to generate first modulated data when the grayscales of the second image data are equal to each other and the grayscales of the first image data are equal to the grayscales of the second image data; and providing data voltages to the segment based on the first modulated data.

2. The method of claim 1, wherein the comparing the grayscales of the first image data and the grayscales of the second image data includes:

determining whether the grayscales of the second image data are equal to each other by comparing the grayscales of the second image data with each other; and comparing a representative grayscale of the first image data and a representative grayscale of the second image data.

3. The method of claim 2, wherein the modulating the second image data includes decreasing some grayscales among the grayscales of the second image data.

4. The method of claim 3, wherein decreased amounts of the some grayscales are determined based on a size of the display device.

5. The method of claim 3, wherein decreased amounts of the some grayscales are determined based on the representative grayscale of the second image data.

6. The method of claim 2, wherein the comparing the grayscales of the first image data and the grayscales of the second image data further includes storing the representative grayscale of the second image data.

7. The method of claim 1, further comprising:

comparing the grayscales of the second image data and grayscales of a third image data of a third frame after the second frame with respect to the segment;

modulating the third image data to generate second modulated data when the grayscales of the second image data are equal to the grayscales of the third image data; and providing the data voltages to the segment based on the second modulated data.

8. The method of claim 7, wherein the modulating the second image data includes modulating the grayscales of the second image data with respect to pixels in the segment which are positioned in even rows and odd columns or positioned in odd rows and even columns, and wherein the modulating the third image data includes modulating the grayscales of the third image data with respect to pixels in the segment which are positioned in the odd rows and the odd columns or positioned in the even rows and even columns.

9. The method of claim 7, wherein the modulating the second image data includes modulating the grayscales of the second image data with respect to a pixel in the segment which is positioned in an $N^{th}$ row and an $N^{th}$ column, wherein N is a natural number, and wherein the modulating the third image data includes modulating the grayscales of the third image data with respect to a pixel in the segment which is positioned in the $N^{th}$ row and an $(N+1)^{th}$ column.

10. A display device comprising:

a display panel including a plurality of segments, each including a plurality of pixels;

a controller which compares grayscales of first image data of a first frame with respect to a segment among the plurality of segments and grayscales of second image data of a second frame after the first frame with respect to the segment, and modulates the second image data to generate first modulated data when the grayscales of the second image data are equal to each other and the grayscales of the first image data are equal to the grayscales of the second image data; and a data driver which provides data voltages to the segment based on the first modulated data.

11. The display device of claim 10, wherein the controller includes:

a first grayscale comparator which determines whether the grayscales of the second image data are equal to each other by comparing the grayscales of the second image data with each other;

a second grayscale comparator which compares a representative grayscale of the first image data and a representative grayscale of the second image data; and a data modulator which modulates the second image data to generate the first modulated data.

12. The display device of claim 11, wherein the data modulator decreases some grayscales among the grayscales of the second image data to generate the first modulated data.

13. The display device of claim 12, wherein decreased amounts of the some grayscales are determined based on at least one selected from a size of the display panel and the representative grayscale of the second image data.

14. The display device of claim 11, wherein the controller further includes a memory which stores the representative grayscale of the second image data.

* * * * *